US008255152B2

(12) United States Patent
Barth et al.

(10) Patent No.: US 8,255,152 B2
(45) Date of Patent: Aug. 28, 2012

(54) ENVIRONMENTALLY FRIENDLY DRIVING NAVIGATION

(75) Inventors: Matthew Barth, Riverside, CA (US); Kanok Boriboonsomsin, Bakersfield, CA (US)

(73) Assignee: The Regents of the University of California, Oakland, CA (US)

( * ) Notice: Subject to any disclaimer, the term of this patent is extended or adjusted under 35 U.S.C. 154(b) by 499 days.

(21) Appl. No.: 12/564,563

(22) Filed: Sep. 22, 2009

(65) Prior Publication Data

US 2010/0076675 A1     Mar. 25, 2010

Related U.S. Application Data

(60) Provisional application No. 61/099,884, filed on Sep. 24, 2008.

(51) Int. Cl.
*G01C 21/00* (2006.01)
(52) U.S. Cl. ........ 701/400; 701/410; 701/423; 701/533; 701/123
(58) Field of Classification Search .................. 701/400, 701/410, 36, 423, 425, 533, FOR. 108, 123, 701/532
See application file for complete search history.

(56) References Cited

U.S. PATENT DOCUMENTS

| 2007/0021909 A1* | 1/2007 | Matsuda ........................ 701/208 |
| 2008/0125958 A1* | 5/2008 | Boss et al. ..................... 701/123 |
| 2008/0133120 A1* | 6/2008 | Romanick ..................... 701/123 |
| 2010/0145569 A1* | 6/2010 | Bourque et al. ................ 701/33 |

FOREIGN PATENT DOCUMENTS

| JP | 2006030058 A | 2/2006 |
| JP | 2006098174 A | 4/2006 |
| JP | 2006300780 A | 11/2006 |
| JP | 2008032542 A | 2/2008 |
| WO | 2010036650 A2 | 4/2010 |

OTHER PUBLICATIONS

Beijer, Gijsbertus. International Preliminary Report on Patentability and Written Opinion, Date of Issuance of Report: Mar. 29, 2011, International Application No. PCT/US2009/057851.
Lee, Byung Kyul. International Search Report and Written Opinion, Date of Mailing of Report: May 10, 2010, International Application No. PCT/US2009/057851.
Department of Energy, Energy Information Administration; see web site: http://www.eia.doe.gov/emeu/rtecs/contents.html, accessed Jan. 2007.
Anh, K. and H. Rakha (2007) "Energy and Environmental Impacts of Route Choice Decisions", in Proceedings of 2007 Transportation Research Board Annual Meeting, Washington D.C., Jan. 2007.
Barth, M., F. An, T. Younglove, C. Levine, G. Scora, M. Ross, and T. Wenzel. (1999) "The Development of a Comprehensive Modal Emissions Model", Final report submitted to the National Cooperative Highway Research Program, Nov. 1999, 255 p.
Barth, M., et al., (1996) "Modal Emissions Modeling: A Physical Approach", Transportation Research Record No. 1520, pp. 81-88, Transportation Research Board, National Academy of Science.

(Continued)

*Primary Examiner* — Gertrude Arthur Jeanglaude
(74) *Attorney, Agent, or Firm* — Joseph R. Baker, Jr.; Gavrilovich, Dodd & Lindsey, LLP

(57) ABSTRACT

The disclosure relates to vehicle navigation systems. More specifically, the disclosure relates to vehicle navigation systems that utilize fuel use and emissions criteria as a parameter to determine directions between two locations.

27 Claims, 5 Drawing Sheets

OTHER PUBLICATIONS

Barth, M., T. Younglove, T. Wenzel, G. Scora, F. An, M. Ross, and J. Norbeck (1997) "Analysis of modal emissions from a diverse in-use vehicle fleet". Transportation Research Record, No. 1587, pp. 73-84, Transportation Research Board, National Academy of Science.

Barth, M. T. Younglove, and G. Scora. (2004) "The Development of a Heavy-Duty Diesel Vehicle Model", Transportation Research Record No. 1880, pp. 10-20, Journal of the Transportation Research Board, National Academy of Science.

Barth, M., C. Malcolm, T. Younglove, and N. Hill. Recent Validation Efforts for a Comprehensive Modal Emissions Model. In Transportation Research Record No. 1750, TRB, Washington, D.C., 2001, pp. 13-23.

Chabini, I. and S. Lan (2002) "Adaptation of A* Algorithm for the Computation of Fastest Path in Deterministic Discrete-time Dynamic Networks", IEEE Transactions on Intelligent Transportation System, vol. 3, No. 1.

Chen, C, Jia, Z, Petty, K, Shu, J, Skabardonis, A, and Varaiya, P. "Freeway Performance Measurement System (PeMS) Shows Big Picture", feature article, California PATH Intellimotion, V 9, No. 2, 2000.

Choe, T., A. Skabardonis, P. Varaiya. (2002) "Freeway Performance Measurement System (PeMS): An Operational Analysis Tool", Proceedings of the 81st Transportation Research Board Annual Meeting, National Academies, Washington, D.C. Jan. 2002.

Dowling, R., R. Ireson, A. Skarbardonis, D. Gillen, and P. Stopher. Predicting Air Quality Effects of Traffic-Flow Improvements: Final Report and User's Guide. NCHRP Report 535, Transportation Research Board, Washington, D.C., 2005.

Fernández, P. C. and Long, J. R. (1995) Grades and other loads effects on on-road emissions: an on-board analyzer study. Fifth CRC On-Road Vehicle Emission Workshop, San Diego, Apr. 3-5.

Makris, P., A. Makri, and C. Provatidis (2005) "Energy-saving methodology for material handling applications", Journal of Applied Energy, 2005.11.005, Elsevier Press.

Park, S. and Rakha, H. (2006) Energy and environmental impacts of roadway grades. Proceeding of the 85th Annual Meeting of Transportation Research Board (CD-ROM), Washington, D.C., January.

Schrank, D. and T. Lomax (2005) "The 2005 Urban Mobility Report", Texas Transportation Institute, see http://tti.tamu.edu/documents/mobility_report_2005.pdf, (accessed Jan. 2007).

Zhu, W., and M. Barth (2006) "Vehicle Trajectory-Based Road Type and Congestion Recognition using Wavelet Analysis", Proceedings of the IEEE Intelligent Transportation Systems Conference 2006, Toronto, Canada, Sep. 2006.

\* cited by examiner

ENVIRONMENTALLY FRIENDLY DRIVING NAVIGATION

CROSS REFERENCE TO RELATED APPLICATIONS

This application claims priority under 35 U.S.C. §119 from Provisional Application Ser. No. 61/099,884, filed Sep. 24, 2008, the disclosure of which is incorporated herein by reference.

TECHNICAL FIELD

The invention relates to vehicle navigation systems. More specifically, the invention relates to vehicle navigation systems that utilize fuel use and emissions criteria as a parameter to determine directions between two locations.

BACKGROUND

The total number of vehicle miles traveled (VMT) on our highways continues to increase across the nation, with people driving greater distances and for longer periods of time. This travel demand consumes large quantities of fuel, corresponding to approximately 50% of our nation's energy costs. Given this steadily increasing travel demand with limited infrastructure growth, highway congestion continues to get worse. There is now a strong need to make our highway travel as efficient as possible. Several studies have been carried out examining roadway congestion in terms of lost productivity and wasted fuel; e.g., in 2003 it has been estimated that 8.7 billion liters of fuel were wasted due to congestion.

SUMMARY

The disclosure provides methods and systems to calculate not only distance- and time-minimizing paths, but also energy- and emissions-minimizing paths as part of a network-level navigational tool. The energy- and emissions-minimization is based on incorporating a state-of-the-art mobile-source energy/emissions model that has been calibrated with real-world vehicle activity patterns. It was found that in many cases, a time minimization path often also minimizes energy use and emissions. However, when congestion occurs, there are cases where this is not true. Because energy and emissions are often higher at lower congested speeds, a heavily congested (but shorter) path may not be the most environmentally friendly. In contrast, moderate congestion often provides a better choice from an environmental perspective. Moderate congestion generally reduces average traffic speeds from higher freeflow conditions, where vehicles have increased energy consumption and emissions due to higher loads placed on the vehicle engines.

The disclosure provides an environmentally friendly navigation system comprising hardware and software for determining a transportation route with the lowest emissions and/or lowest fuel consumption. For example, the disclosure provides a system for identifying an environmentally-friendly and/or fuel saving travel route, comprising: an input device; a processor; wherein the input device receives at least one travel parameter and wherein the travel parameter is stored for use by the processor, the processor configured to collect (i) road condition parameters comprising traffic velocity information data and road grade, and (ii) a vehicle energy/emissions data-model; a computer program on a computer readable medium that cause the computer to: associate the road condition parameters with one or a plurality of links in a travel route, the plurality of links representing one or more possible travel routes from a start point to a destination point; calculate fuel consumption and/or emissions for a selected route using road condition parameters and vehicle energy/emission data-model; and calculate a possible travel route from the start point to the destination point, wherein the route that uses the least fuel and/or produces the least emissions is identified as a travel route from the one or more possible travel routes and output to a user. The system may be an on-board vehicle navigation system, a cellular phone, or a portable navigation system. Such systems may comprise audible and/or graphical directions output to a user.

The disclosure also provides a method for identifying an environmentally and/or fuel saving travel route, comprising: collecting (i) road conditions parameters comprising traffic velocity information data and road grade, and (ii) vehicle energy/emission data-model; associating the road conditions parameters with one or a plurality of links in a travel route, the plurality of links representing one or more possible travel routes from a start point to a destination point; calculating fuel consumption and/or emissions for a selected route using road condition parameters and vehicle energy/emission data-model; and calculating a possible travel route from the start point to the destination point, wherein the route that uses the least fuel and/or produces the least emissions is the possible travel route from the one or more possible travel routes. The travel route can be output to a user in graphical and/or audible form.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
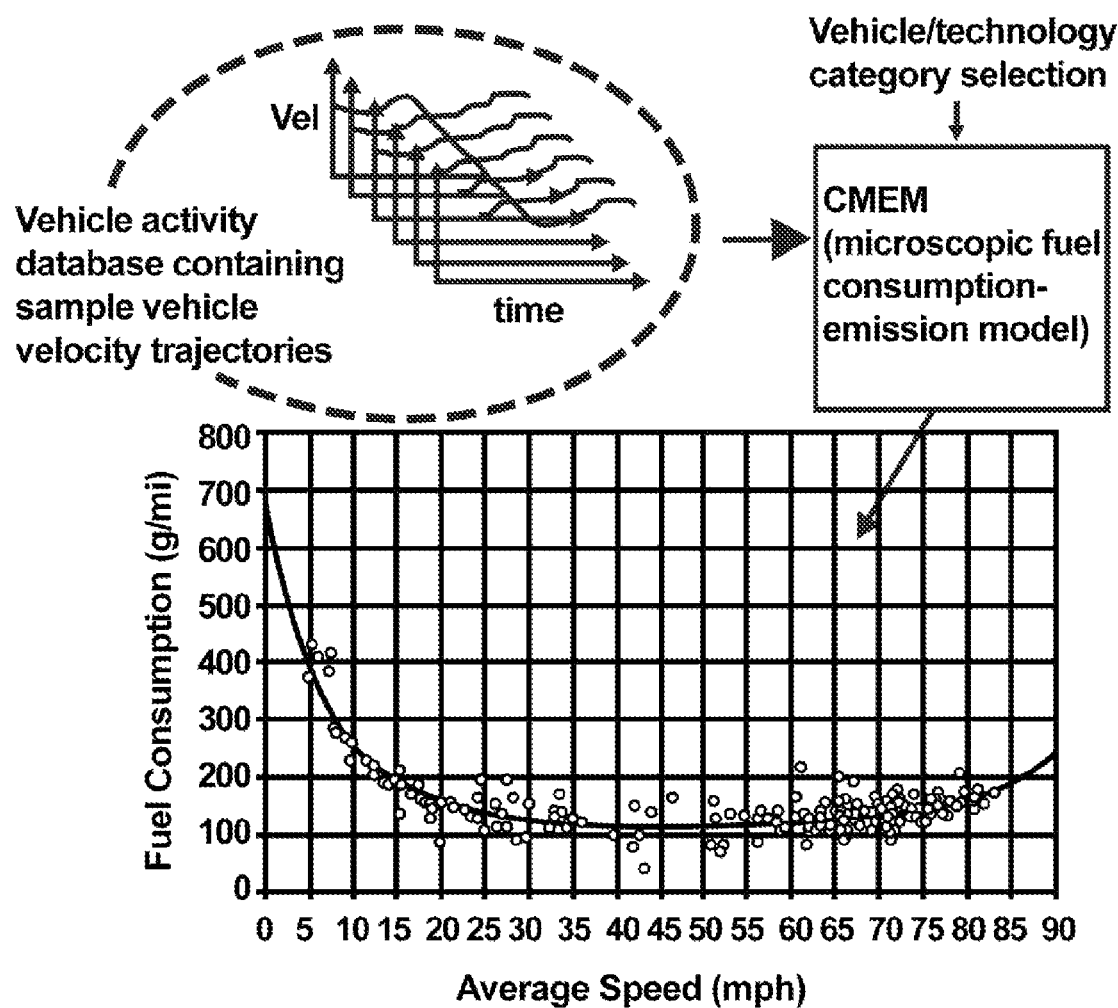
FIG. 1 shows an overall method of developing link-based energy/emission factors for use in environmentally friendly navigation.

As used herein and in the appended claims, the singular forms "a," "and," and "the" include plural referents unless the context clearly dictates otherwise. Thus, for example, reference to "a node" includes a plurality of such nodes and reference to "the link" includes reference to one or more links and equivalents thereof and so forth.

Unless defined otherwise, all technical and scientific terms used herein have the same meaning as commonly understood to one of ordinary skill in the art to which this disclosure belongs. Although any methods and reagents similar or equivalent to those described herein can be used in the practice of the disclosed methods and compositions, the exemplary methods and materials are now described.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated herein by reference in full for the purpose of describing and disclosing the methodologies, which are described in the publications, which might be used in connection with the description herein. The publications discussed above and throughout the text are provided solely for their disclosure prior to the filing date of the present application. Nothing herein is to be construed as an admission that the inventors are not entitled to antedate such disclosure by virtue of prior disclosure.

A significant amount of fuel is wasted and harmful environmental pollutants produced due to drivers getting lost or not taking a direct route to their destinations. Addressing this issue, intelligent transportation system (ITS) technology in the form of navigation tools have certainly helped with this problem. These tools typically rely on calculating a shortest-distance or a shortest-time route.

It is important to point out that in many cases, a time- or distance-minimizing algorithm will also minimize fuel consumption and emissions. However, there are several cases where this is not true, particularly with high levels of congestion and in areas with significant road grades. A shortest-distance algorithm may have a driver travel through heavily congested conditions, resulting in higher fuel consumed. On the other hand, there will also be cases where a shortest-time route will result in longer distances traveled, albeit on less congested roadways. Travel at higher speeds for longer distances will generally result in higher fuel consumption (and emissions) compared to a more direct route at lower speeds. The disclosure provides methods to analyze these differences, estimating the effectiveness of the routing algorithms that minimize fuel consumption.

The disclosure provides a set of route selection algorithms that are designed specifically for minimizing fuel consumption and vehicle emissions. The disclosure utilizes an integration of current navigation technology with sophisticated vehicle energy and emission models. The disclosure provides the ability for a driver to not only have a choice of selecting a shortest-distance or shortest-duration route, but also a route that minimizes the fuel consumed and/or pollutant emissions for that particular trip.

Existing vehicle navigation algorithms in almost all cases focus on travel time or travel distance. The algorithms provided herein are based on energy and emissions alone or in addition to travel distance and time.

The disclosure brings together three areas: 1) navigation technology; 2) vehicle energy/emission models; and 3) vehicle activity analysis.

One of the major successes in ITS technology has been in the area of Advanced Traveler Information Systems (ATIS). In particular, there are now several on-line Internet tools that provide efficient directions from any origin to any destination in our roadway network (e.g., MapQuest™). In addition, many vehicle manufacturers (as well as third party companies) now offer on-board navigation or portable systems that use GPS technology combined with sophisticated mapping software to provide driving directions to specified destinations. These navigation systems typically use a static "shortest-distance" or "shortest-time" algorithm when selecting the best route to take. The shortest-time algorithm is usually calculated based on typical vehicle speeds on different roadway types (e.g., freeways have an average freeflow speed of 95 km/h, arterials at 55 km/h, etc.).

Recently, more advanced navigation systems have been introduced that also use real-time traffic information on congestion and accidents to determine the best route to take to a desired destination. These advanced navigational tools are starting to emerge on the Internet and are used where roadway performance data is available, typically in large metropolitan areas. Further, a few vehicle manufacturers have incorporated real-time traffic information into their on-board navigation systems. For example, several auto manufacturers now offer these advanced navigation systems in their high-end line of vehicles.

The disclosure provides an Environmentally Friendly Navigation (EFNav) and other environmental-ITS applications comprising an Energy/Emissions Operational Parameter Set (EOPS). EOPS comprises a compilation of energy/emissions factors for different vehicles under various roadway and traffic conditions. More specifically, for a given roadway network, EOPS is developed as a function of roadway link characteristics (e.g., road grade, road type) and the traffic conditions on the links (e.g., traffic speed, density). An example is illustrated in FIG. 1. Using a large database of vehicle activity (represented as velocity trajectories collected from probe vehicles), the fuel consumption and emission values of each velocity trajectory are estimated using a state-of-the-art modal emissions model (CMEM, see below) for multiple vehicle categories in the model. Then, the relationships between energy/emissions and roadway/traffic parameters (e.g., average speed and road grade, as shown in FIG. 7) are created that can be used to assign energy and emission factors to each link in the roadway network based on their characteristics and the real-time traffic performance.

Figure 7:
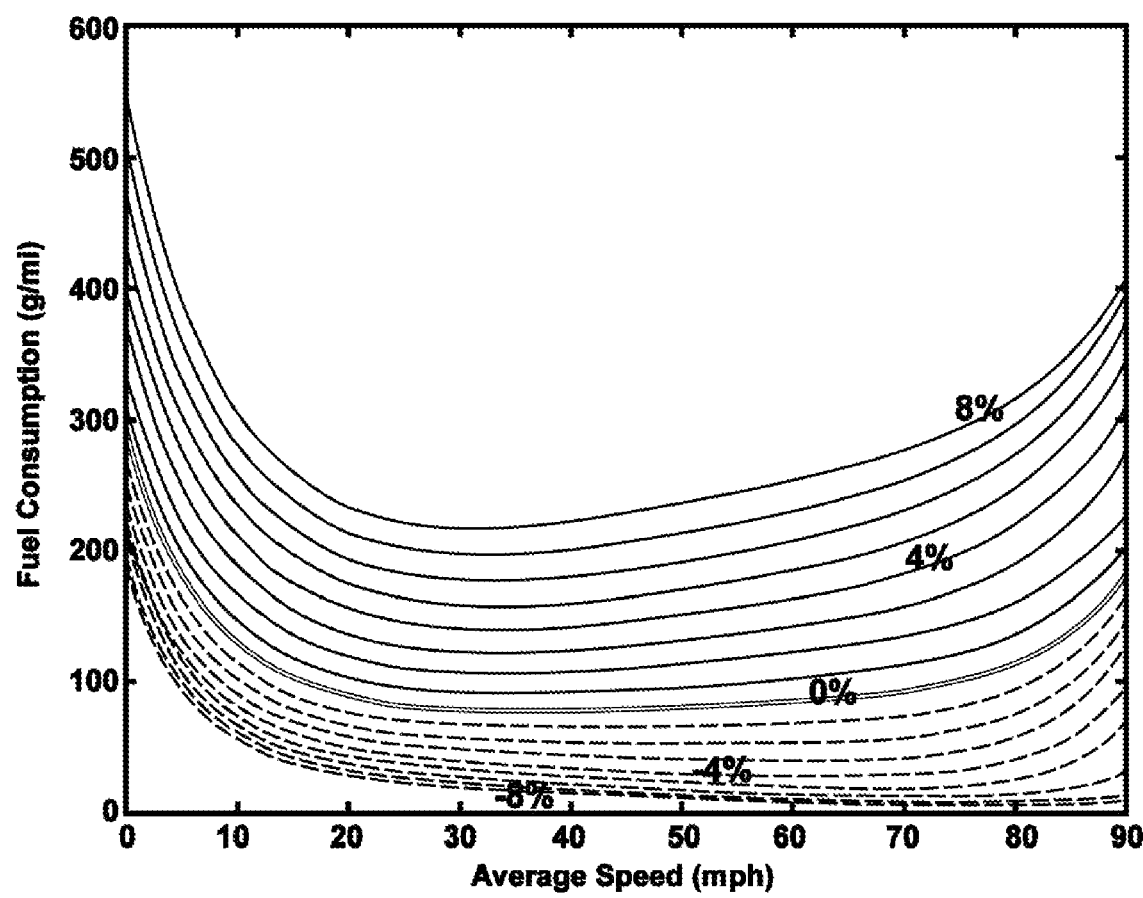
FIG. 7 shows Energy/Emissions Operational Parameter Sets indexed by average speed and road grade.

FIG. 7 shows an example of the effects of vehicle speed and road grade on fuel consumption of light-duty cars. These effects are expected to be even more pronounced for heavy-duty trucks. Vehicles that carry heavier loads will consume more fuel and emit more emissions. Vehicles with different engine model years will have different emission rates as the engines are certified to different emission standards. Lastly, driving on different road types or in different levels of congestion will have different speed profiles; and thus, impact the fuel economy and emissions.

The estimation of the EOPS for different vehicles involves a number of factors which have different impacts on the fuel consumption and emissions. The interaction of these factors plays a role in proper estimations. For instance, in FIG. 7 it is shown that the optimal speed for fuel consumption is not the same for every road grade. Likewise, the optimal speed for a vehicle with a lighter load (e.g., one passenger or empty truck) will be different from the optimal speed for when it is fully loaded (e.g., several passengers or loaded truck). So, it could be best for a vehicle to use one route when carrying a specific load to a destination, and to use another route when returning when lighter. In order to take such interaction into account, a multivariate regression technique is employed to estimate the EOPS:

$$EOPS_i \propto f(v, w, my, g, rt, cl) \quad (1)$$

where: $EOPS_i$=Energy/Emission Operational Parameter Set for i; i={fuel, $CO_2$, CO, HC, $NO_x$, PM}
v=vehicle speed
w=loaded weight
my=model year
g=road grade
rt=road type
cl=congestion level In the equation above, loaded weight and model year are based on user inputs. Road type can be extracted directly from the roadway link characteristic table in a dynamic road network. PeMS can provide the data about congestion level and average traffic speed, which may be used as a surrogate for vehicle speed. For road grade, NAVTEQ and other conventional digital roadway maps do not have this information. However, such high accuracy elevation data can be collected, which can be used to create precise road grade data for each roadway links.

Traffic variables that will be used to estimate the EOPS are quantifiable on a link-by-link basis and in real-time. For example, it is well known that the acceleration rate of vehicles is another important explanatory variable of vehicle emissions, where frequent and intense accelerations/deceleration events will result in higher vehicle emissions and fuel consumption. However, this variable is not currently measured and reported by any traffic monitoring systems. Therefore, the congestion level can reasonably be used as a surrogate. Uncongested traffic usually has smooth flow of traffic with little and mild acceleration/deceleration. On the other hand, congested traffic involves stop-and-go driving with more frequent and harder acceleration/deceleration.

To develop the multivariate regression models, first a database of the response variable (e.g., energy/emission factor) and the associated explanatory variables is assembled. This has been accomplished with the extensive energy/emissions testing performed at UC Riverside's CE-CERT. With this energy/emissions data, we have created a unique energy/emissions model called CMEM, described below.

A Comprehensive Modal Emissions Model (CMEM) uses a microscale model that can predict second-by-second fuel consumption and emissions based on different traffic operations, which is useful for developing and evaluating transportation policy. The CMEM model has been maintained under sponsorship from the U.S. EPA. CMEM is a public-domain model and has several hundred registered users worldwide. CMEM can interface with a wide variety of transportation models and/or transportation data sets in order to perform detailed fuel consumption analyses and to produce a localized emissions inventory. CMEM has been developed primarily for microscale transportation models that typically produce second-by-second vehicle trajectories (location, speed, acceleration). These vehicle trajectories can be applied directly to the model, resulting in both individual and aggregate energy/emissions estimates. Over the past several years, CMEM has been integrated into various transportation modeling frameworks, with a focus on corridor-level analysis and intelligent transportation system implementations (e.g., CORSIM, TRANSIMS, PARAMICS, SHIFT, etc.).

CMEM is comprehensive in the sense that it covers essentially all types of vehicles found on the road today. It consists of nearly 30 vehicle/technology categories from the smallest light-duty vehicles to Class-8 heavy-duty diesel trucks. With CMEM, it is possible to predict energy and emissions from individual vehicles or from an entire fleet of vehicles, operating under a variety of conditions. One of the features of CMEM (and other related models) is that it uses a physical, power-demand approach based on a parameterized analytical representation of fuel consumption and emissions production. In this type of model, the entire fuel consumption and emissions process is broken down into components that correspond to physical phenomena associated with vehicle operation and emissions production. Each component is modeled as an analytical representation consisting of various parameters that are characteristic of the process. These parameters vary according to the vehicle type, engine, emission technology, and level of deterioration. One distinct advantage of this physical approach is that it is possible to adjust many of these physical parameters to predict energy consumption and emissions of future vehicle models and applications of new technology (e.g., after treatment devices). CMEM has been rigorously validated and is considered to be one of the most detailed and best tested estimates of vehicle exhaust emissions at different speeds and accelerations. Further, CMEM also accounts for road grade effects. It has been shown that road grade has a significant effect on fuel consumption and emissions.

Complementary to the vehicle energy/emissions modeling, having a representation of vehicle activity is important. To satisfy this need, large vehicle activity data sets in the form of vehicle trajectories (e.g., at the microscale, second-by-second position and speed of vehicle) have been collected using GPS-equipped probe vehicles. The vehicle velocity patterns have been analyzed in great detail, corresponding to different levels of congestion on different roadway facility types. Using the microscale vehicle activity database, the disclosure provides functional relationships between the microscale velocity patterns of individual vehicles and macroscale traffic measurements such as average traffic speed, density, and flow. Using these developed relationships between macro- and microscale parameters, it is possible to estimate representative velocity trajectories for different levels of measured congestion. Taking it one step further, it is then possible to estimate vehicle fleet fuel consumption and emissions from traffic flow, density, and speed measurements when combined with the CMEM energy/emissions model described above.

Digital roadway networks consist of nodes and links. A node refers to, for example, intersections, freeway on/off-ramps, points of curvature, points of interest and the like. A link refers to the road sections between nodes. Specific link and node attributes define how the network is connected together and what the general features are of the different links/nodes (e.g., position, length, number of lanes, capacity, speed limit, grade etc.).

Congestion, and velocity can be obtained by sensors present in the roadways or through historical data obtained for a particular link. In addition, changes in road repairs can be identified in links to assist in identifying sections of link where congestion may be different than historical data.

Typical navigation algorithms usually consist of finding a particular path between two nodes in the network. This path is usually based on some optimality such as shortest distance or shortest duration. Dijkstra's algorithm is a prime example of a solution to the macroscale route-planning problem, however other more efficient algorithms exist.

The disclosure provides methods and processes and devices for carrying out such methods and process that assign specific fuel consumption and emission factors for each link in the roadway network. Because these factors are a function of traffic parameters (e.g., speed, congestion), each link can also have traffic performance data. For the freeway links, these traffic performance data can be obtained from the PeMS system. Each embedded roadway sensor is matched to the link in the network. For other links that do not have real-time data, default freeflow speed values are used. Similarly, each link in the network should also have a road grade value. Road grade values can be assigned to each link in a travel route. Once the link-based traffic data (and e.g., road grade) are in place, then the fuel consumption and emissions (i.e., carbon dioxide ($CO_2$), carbon monoxide (CO), hydrocarbons (HC), and oxides of nitrogen (NOx)) values are calculated for each link, for each vehicle/technology type within CMEM. It is important to note that in addition to calculating environmentally-friendly paths for a specific vehicle/technology type (e.g., heavy-duty truck), it is also possible to calculate the path for a fleet of vehicles. All that is needed is a vehicle fleet composition matrix, providing the percentage of each vehicle/technology group in the fleet for the area of interest.

Data useful in obtaining traffic conditions and roadway closures may come from a variety of sources, and in a variety of forms. For example, data sources can include the TravInfo™ system (a collaboration of public agencies including the California Highway Patrol, Metropolitan Transportation Commission and CALTRANS). Data may come from a web service or other state or municipality monitoring systems. Other exemplary data sources include the National Weather Service, the PeMS system at the University of Berkeley, Public Event Listings, as well as data input manually by system operators or users using, for example, a User Input Mechanism.

In one embodiment, the methods and systems of the disclosure use ArcGIS 9.1, a popular Geographical Information System (GIS) software environment that is produced by ESRI. Roadway network data was imported for Southern California. A specific module was developed to link the roadway network database with the real-time traffic performance data (e.g., PeMS), obtaining data every five minutes. Further, several other fields were added to the roadway network database, specifically road grade, fuel consumption, $CO_2$, CO, HC, and NOx for the different vehicle/technology categories in the CMEM model. Using the Network Analyst toolbox, the path minimization feature is utilized, which can be set to minimize based on any characteristic of the roadway link data. As a result, it is possible to compare minimal routing paths for distance, time, energy, and the various emissions.

The California PeMS system collects real-time speed, flow, and density data from loop detectors embedded in California's freeways and makes it available for transportation management, research, and commercial use. The system provides real-time five-minute, per-loop averages of occupancy, flow, speed, and congestion for various links in the roadway network. The data are available over the Internet; for more information on PeMS, see http://pems.eecs.berkeley.edu/Public/index.phtml.

The overall methodology for developing environmentally-friendly navigation can be broken down into two general components: 1) For a given roadway network, link-based energy and emission factors have been developed that can be indexed by link characteristics such as flow, density, speed, and grade; and 2) given appropriate link-based energy and emission factors, network-wide routing algorithms were developed that minimize fuel consumption and emissions. These routing algorithms utilize real-time data on traffic performance with the developed energy/emission factors for the roadway network under study.

The method used to build link-based energy and emission factors is illustrated in FIG. 1. As described, a large vehicle activity database has been collected from GPS-instrumented probe vehicles, providing time- and position-indexed speed data of a sample vehicle in the traffic stream. Simultaneously, traffic flow, density, and average speed data are collected from the California PeMS system, in particular for the embedded road sensors that the probe vehicle is traveling over. The trajectory snippets (e.g., several seconds before and several seconds after the vehicle passes over the sensor location) are then correlated to the flow, density, and speed measurements from PeMS. The probe vehicle data were collected in the Southern California road network at different times of the day under different congestion conditions.

This velocity snippet database was then run through the comprehensive modal emissions/energy model, for all vehicle/technology categories represented in the model. As a result, average fuel consumption and emissions factors were developed for the corresponding traffic speeds and congestion conditions. The lower part of FIG. 1 illustrates these factors as a function of only traffic speed. In this energy/emissions vs. speed graph, a large amount of data scatter typically results for a given speed, caused by different congestion conditions. For example, there are many vehicle velocity trajectories that have the same average speed. However, many have very different trajectories due to congestion effects. A vehicle can travel at a relatively smooth 80 km/h under moderate traffic density, or have significant stop-and-go conditions that still average 80 km/h under higher density conditions. These two types of velocity trajectories will have significantly different fuel consumption and emission values. Other link characteristics that go beyond using average traffic speed can be incorporated into the calculations. Additional data such as link volume-to-capacity ratio or average traffic density are good candidates to help predict different congestion conditions, allowing for a more accurate fuel consumption estimate given link travel conditions.

Further, road grade also plays a key role in vehicle fuel consumption and emissions. It is possible to also include road grade as another link characteristic when calculating the link energy/emission factors. To date, digital roadway networks typically do not include road grade information. However, new-generation network data that include grade information are currently being developed, which will be incorporated into the energy/emission factors in the future.

The examples provided herein have been performed on roadways that have real-time traffic performance data available, e.g., mostly on freeways in Southern California. The method is applicable to other roadways. In another embodiment, instead of real-time traffic performance, roadway freeflow design speeds could be used. As traffic performance data improves (including arterials and other roadways), the energy- and emissions-minimization navigation will be more effective.

Further, it is expected that road grade will also play a significant role in environmentally friendly navigation. For example, if one route has significant hills to traverse compared to a slightly longer route, the slightly longer route might be the more environmentally beneficial route. Road grade values have been incorporated into the roadway network database for each link. The CMEM model has direct inputs of road grade and accounts for the added effect of load on the vehicles.

On-board, mobile (e.g., cell phone and portable) navigation systems that not only have the real-time shortest-time and shortest-distance navigational choices are also provided that comprise methods (e.g., computer programs) to calculate the lowest energy and emissions choices between two points. Such system can be used to calculate the most fuel efficient and/or least emission route and output the information to a user.

As described earlier, a shortest-time or shortest-distance path will often be the path that minimizes energy use or emissions. This makes sense since the shorter amount of time a vehicle spends on the roadway, the aggregated energy/emission use will be less. However, if there is roadway congestion and other factors including, for example, steep grades, the energy and emissions could be different.

To illustrate this, four example case studies are provided, all for an example set of routes in the general Los Angeles Calif. region. Specifically, there are several freeway routes that provide access to/from downtown Los Angeles to the Inland Empire region, which is made up of many suburban communities. The typical driving pattern consists of work commutes from the Inland Empire to downtown Los Angeles in the morning, and a return commute back in the afternoon. Because of the high volume of commute trips, these freeways often suffer from congestion. To illustrate the effect of route choice on energy/emissions under various traffic conditions, example trips from downtown Los Angeles to Chino, Calif. were used. Two comparable freeway routes were used: 1) taking Interstate 10 followed by State Route 71 (referred to I-10 route), and 2) taking State Route 60 (referred to SR-60 route). These routes have approximately the same distance (around 44 km). For all four case studies, the CMEM model has been calibrated to provide energy/emissions for the typical light-duty truck or sports utility vehicle on the freeways under consideration.

Figure 2:
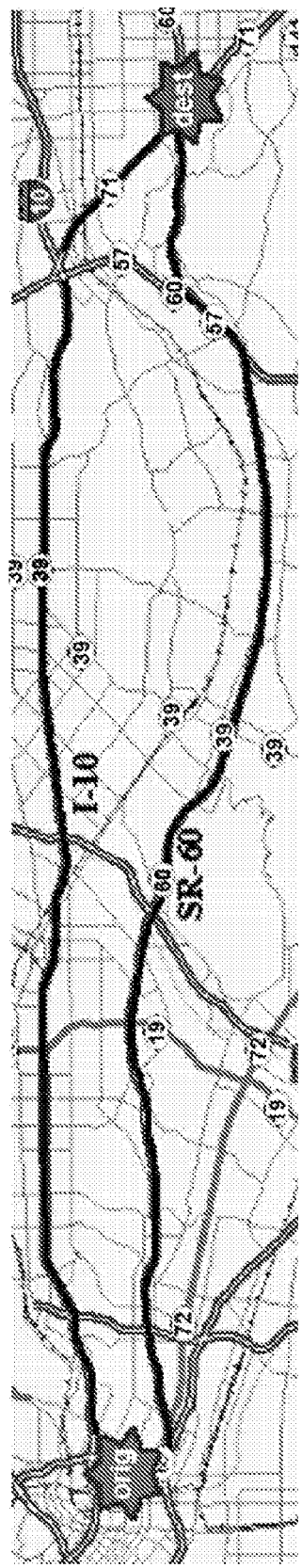
FIG. 2 shows road network for example case study A: freeflow conditions on both freeways between Los Angeles and Chino. Note that roadway links are colored based on their real-time traffic speeds (0-40 km/h: magenta; 40-65 km/h: orange; 65-90 km/h: blue; 90+ km/h: green).

To demonstrate the case study where the best energy/emissions route is the same as the shortest-time route, consider an example trip on May 20, 2007 at 1:15 AM. Unsurprisingly, during this night time all freeways were uncongested and traffic was at free-flow, as shown in FIG. 2. The summary of distance, travel time, as well as estimated fuel consumption and emissions are given in Table 1. Because of the uncongested condition, a vehicle could travel at the free-flow speed on both routes. Therefore, the energy and emissions results are similar for either route (e.g., within a few percentage).

TABLE 1

Results for case study A: freeflow conditions on both freeways between Los Angeles and Chino.

| Performance Measure | I-10 path | SR-60 path | % Diff |
|---|---|---|---|
| Distance (km) | 43.97 | 44.86 | −1.97 |
| Travel time (minutes) | 22.65 | 23.55 | −3.82 |
| Fuel consumption (g) | 3,766.62 | 3,780.03 | −0.35 |
| $CO_2$ (g) | 11,530.54 | 11,600.42 | −0.60 |
| CO (g) | 143.10 | 133.82 | 6.93 |
| HC (g) | 3.99 | 3.90 | 2.31 |
| $NO_x$ (g) | 9.82 | 9.80 | 0.20 |

Figure 3:
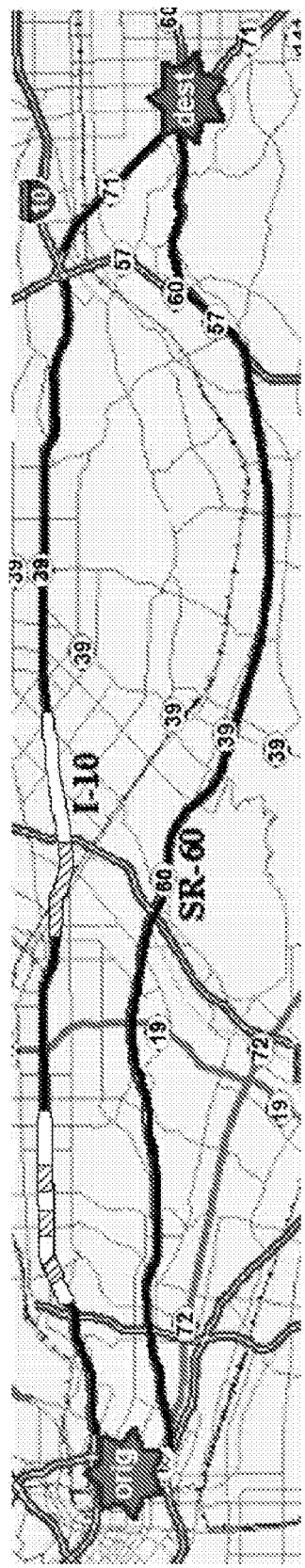
FIG. 3 shows road network for case study B: freeflow conditions on SR-60 and moderate congestion on I-10.

To illustrate the case where the most environmentally-friendly route is not necessarily the same as the shortest-time route, consider a trip on Jun. 9, 2007 at 12:20 PM. In this case, the SR-60 route was operating at near free-flow conditions while the alternative I-10 route was experiencing some moderate congestion (see FIG. 3). In this case, the SR-60 route is definitely the faster route (about 5 minutes faster); however, the I-10 route is more beneficial environmentally, as summarized in Table 2. The reason that fuel consumption and emissions are less is because the vehicles are operating in a moderate congestion regime, where the slightly lower speeds have less load on the vehicle engines, resulting in lower fuel consumption and emissions.

TABLE 2

Results for case study B: freeflow conditions on SR-60 and moderate congestion on I-10.

| Performance Measure | I-10 path | SR-60 path | % Diff |
|---|---|---|---|
| Distance (km) | 43.97 | 44.86 | −1.97 |
| Travel time (minutes) | 29.23 | 23.55 | 24.12 |
| Fuel consumption (g) | 3,458.90 | 3,799.68 | −8.97 |
| $CO_2$ (g) | 10,703.61 | 11,645.16 | −8.09 |
| CO (g) | 88.01 | 141.15 | −37.65 |
| HC (g) | 3.09 | 3.97 | −22.17 |
| $NO_x$ (g) | 8.77 | 9.90 | −11.41 |

Figure 4:
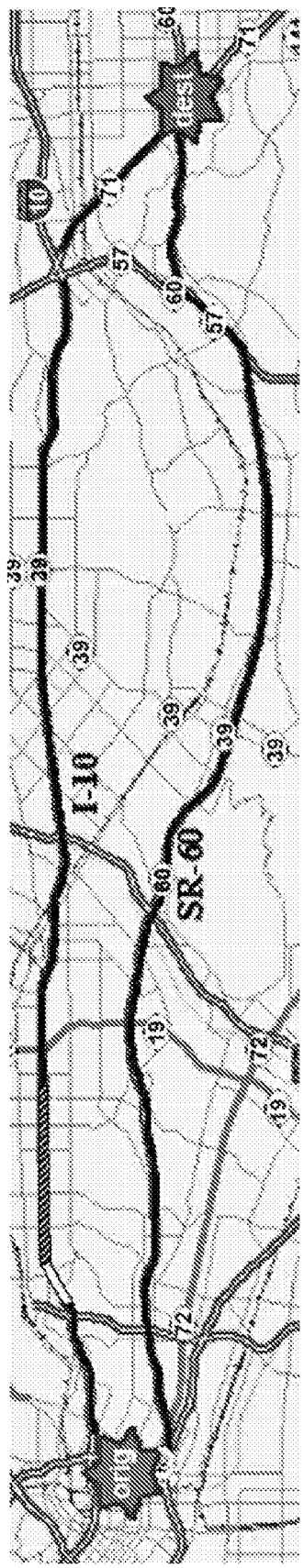
FIG. 4 shows road network for case study C: mostly freeflow conditions on SR-60 and heavy congestion on I-10.

Another case to consider is when one route is operating under free-flow conditions and the other route has slightly heavy congestion. This was the case for I-10 on Jun. 17, 2007 at 5:10 PM. As illustrated in FIG. 4 and Table 3, because the travel time was significantly longer (71%), and the traffic was under stop-and-go conditions part of the time, the fuel use was higher than the free-flow route. This illustrates that heavy congestion is typically detrimental to fuel consumption.

TABLE 3

Results for case study C: mostly freeflow conditions on SR-60 and heavy congestion on I-10.

| Performance Measure | I-10 path | SR-60 path | % Diff |
|---|---|---|---|
| Distance (km) | 43.97 | 44.86 | −1.97 |
| Travel time (minutes) | 41.07 | 24.00 | 71.13 |
| Fuel consumption (g) | 4,042.54 | 3,717.99 | 8.73 |
| $CO_2$ (g) | 12,479.80 | 11,437.82 | 9.11 |
| CO (g) | 119.05 | 122.41 | −2.74 |
| HC (g) | 3.58 | 3.73 | −4.02 |
| $NO_x$ (g) | 9.57 | 9.59 | −0.21 |

Figure 5:
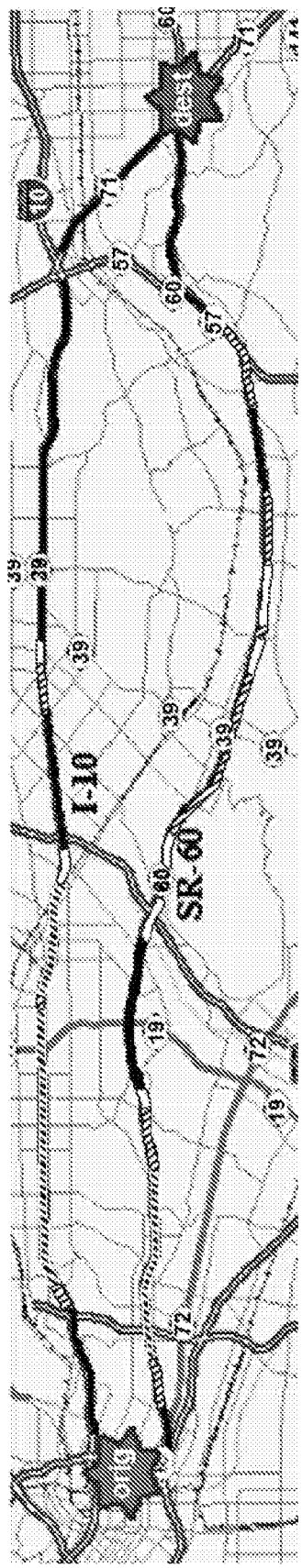
FIG. 5 shows results for case study D: moderate congestion on SR-60 and heavy congestion on I-10.

The last case is when one route is operating under moderate congestion and the other route experiences severe congestion, typically due to an accident. This has occurred on I-10 on Jun. 28, 2007 at 2:35 PM (see FIG. 5). Although the trip on the SR-60 route took longer than it should have been, the trip on the I-10 route was much worse. It took more than twice as much travel time as the SR-60 route. This also resulted in dramatic negative impacts on energy and emissions, as presented in Table 4.

TABLE 4

Results for case study D: moderate congestion on SR-60 and heavy congestion on I-10.

| Performance Measure | I-10 path | SR-60 path | % Diff |
|---|---|---|---|
| Distance (km) | 43.97 | 44.86 | −1.97 |
| Travel time (minutes) | 93.40 | 41.01 | 127.75 |
| Fuel consumption (g) | 4,770.07 | 3,360.50 | 42.15 |
| $CO_2$ (g) | 14,917.86 | 10,505.36 | 42.00 |
| CO (g) | 62.98 | 46.34 | 35.91 |
| HC (g) | 2.83 | 2.36 | 19.92 |
| $NO_x$ (g) | 9.24 | 8.09 | 14.22 |

An example of a device of the disclosure comprises a navigation system (e.g., an on-board, cellular, or portable system) comprising (1) a Dynamic Roadway Network, which is a digital map of roadway network that integrates real-time traffic information from multiple sources; (2) an Energy/Emissions Operational Parameter Set (EOPS), which is a compilation of energy/emissions factors for a wide range of vehicles under various roadway and traffic conditions; (3) a routing engine, which consists of optimization algorithms used for calculating optimal routes; and (4) user interfaces that receive origin/destination inputs from users and display route maps to the users.

Figure 6:
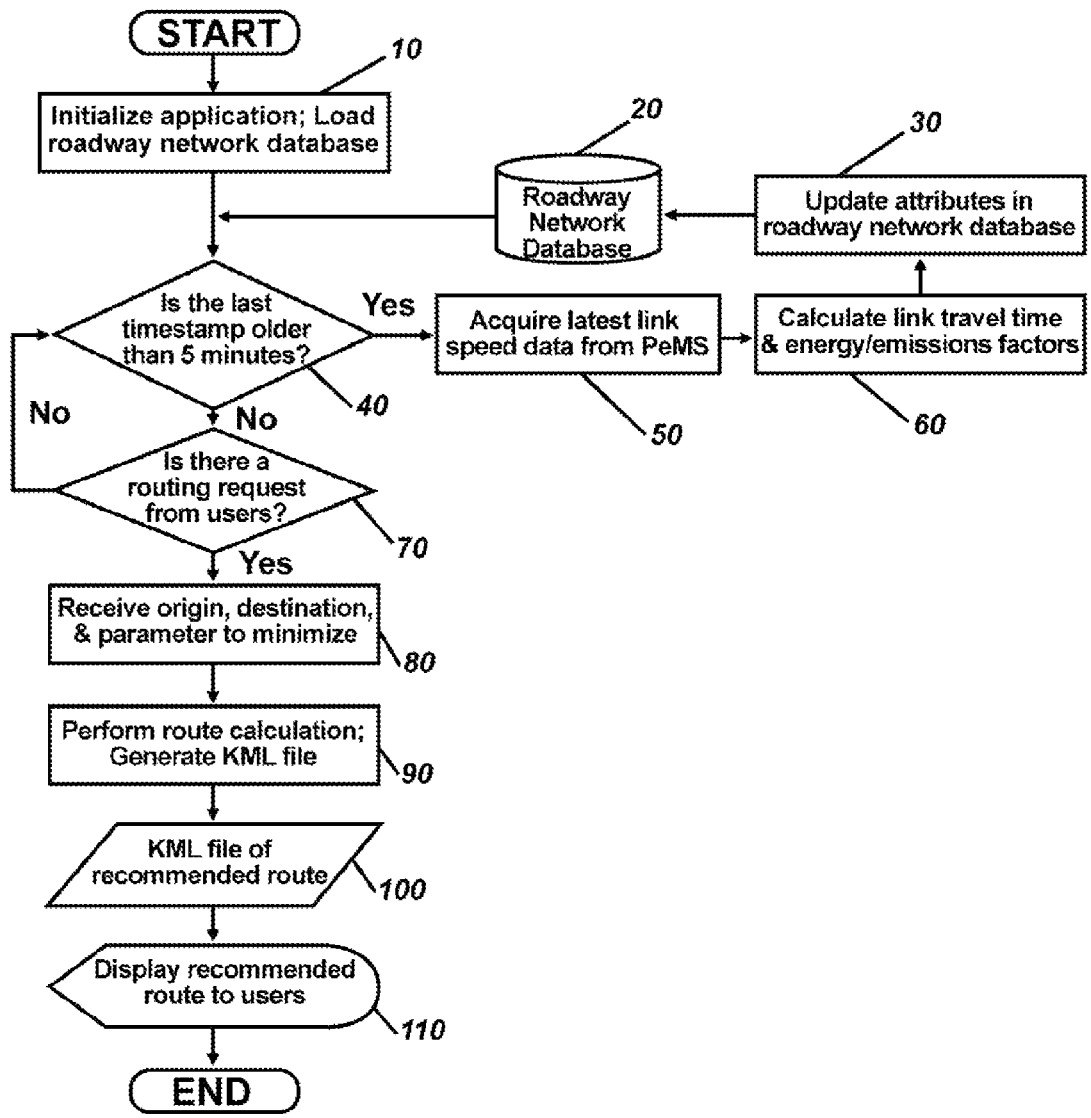
FIG. 6 shows an exemplary flow chart of the methods of the disclosure.

FIG. 6 depicts an exemplary flow process and method of the disclosure. As initialization (10) the system loads a roadway network database (e.g., a map) comprising nodes and links for a geographic area. Typically the geographic area will comprise a home location, which may be preprogrammed or associated with a GPS identified location. The method then determines the age of the information in the roadway network database (40). For example, where real-time traffic conditions are obtainable the system determines whether the timestamp of the roadway network database is older than a threshold value (e.g., 1 minute, 2 minutes, 5 minutes, 10 minutes, etc.). If the time stamp is older than the threshold value (e.g., 5 minutes) the method proceeds to obtain the latest data information on the road conditions (50). Using the roadway network performance (e.g., PeMS data), which may also include road grade information, and the fuel/emissions information for the vehicle type or category, the method calculates an energy and/or emissions consumption and output value, respectively, for one or more links in the roadway network (60). The energy and/or emissions values are then sent to the roadway network database (30) and the database updated (20). In one embodiment, the process of determining the timestamp and updating the roadway network data can be performed after a user request for navigation information. In yet another aspect, the fuel consumption and/or emissions values may be output to a navigation screen continually and in real-time or at defined time intervals.

Also depicted in FIG. 6 is a user request for routing (70). Upon a user request (70) the system can prompt for origin, destination, nearest location or other information to assist the computer in identifying links between two nodes (80). This information is then used to pull or calculate energy/emission values from the roadwork database associated with links in the routing request (90). A data exchange format can then be used to annotate a map showing the possible routes and fuel/emissions values. For example, the methods can annotate maps, and/or enable data layers to show, for example, parks, schools, hospitals, airports, shopping, and other points of interest or locales. The method can layer multiple route results, save results to folders, and share results. A data exchange format referred to herein includes KML (Keyhole Markup Language) which can be used to annotate maps from to display points and lines on the digital map. A markup language refers to a language that has code that indicates layout, styling, and placement of graphics. This information is then processed to identify lowest emission, lowest fuel consumption, fastest time or any combination thereof (100). The method can identify the route having the lowest fuels consumption and/or emissions production to the user (110).

The methods of the disclosure can be specifically implemented in a computer comprising navigational software, digital maps, route information and user interfaces. Computers may be employed in the practice of the methods of the disclosure to identify environmentally friendly vehicle routing information. Various general purpose machines may be used with programs written in accordance with the teachings herein, or it may be more convenient to construct more specialized apparatus to perform the operations. However, the embodiment will typically be implemented in one or more computer programs executing on programmable systems each comprising at least one processor, at least one data storage system (including volatile and non-volatile memory and/or storage elements), at least one input device, and at least one output device. The program is executed on a processor to perform the functions described herein.

Each such program may be implemented in any desired computer language (including machine, assembly, high level procedural, or object oriented programming languages) to communicate with a computer system. In any case, the language may be a compiled or interpreted language. The computer program will typically be stored on a storage media or device (e.g., ROM, CD-ROM, or magnetic or optical media) readable by a general or special purpose programmable computer, for configuring and operating the computer when the storage media or device is read by the computer to perform the procedures described herein. The system may also be considered to be implemented as a computer-readable storage medium, configured with a computer program, where the storage medium so configured causes a computer to operate in a specific and predefined manner to perform the functions described herein.

Embodiments of the disclosure include systems (e.g., internet based systems), particularly computer systems which store, display and manipulate the coordinate and value information described herein. As used herein, "a computer system" refers to the hardware components, software components, and data storage components used to analyze the information associated with vehicle fuel consumption and emission in combination with roadway information and traffic flow. The computer system typically includes a processor for processing, e.g., data and instructions, accessing and manipulating the data. The processor can be any well-known type of central processing unit, such as, for example, the Pentium IV or higher from Intel Corporation, or a similar processor from other suppliers such as Sun, Motorola, Compaq, AMD or International Business Machines.

In one particular embodiment, the computer system includes a processor connected to a bus which is connected to a main memory (typically implemented as RAM) and one or more internal data storage devices, such as a hard drive and/or other computer readable media having data recorded thereon. In some embodiments, the computer system further includes one or more data retrieving means for reading the data stored on the internal data storage means. The data retrieving means may represent, for example, a floppy disk drive, a compact disk drive, a magnetic tape drive, or means for connecting to external data-retrieving means, such as ethernet, a modem capable of connection to a remote data storage system (e.g., via the internet), satellite digital communications, radio frequencies and the like. In some embodiments, the internal data storage means is a removable computer readable medium such as a floppy disk, a compact disk, a magnetic tape, and the like, containing control logic and/or data recorded thereon. The computer system may advantageously include or be programmed by appropriate software for reading the control logic and/or the data from the data storage component once inserted in the data retrieving means or device.

The computer system can include a display means which is used to display output such as for example a route between two points that minimizes fuel consumption or emissions to a computer user. The display may also be designed to receive input (e.g., a touch screen) for inputting a destination, vehicle type, estimated load (weight) etc. It should also be noted that the computer system can be linked to other computer systems in a network or wide area network to provide centralized access to the computer system.

Software for accessing and processing the traffic information may reside in main memory during execution.

For exemplary purposes, California's Freeway Performance Measurement System (PeMS) was used to provide real-time traffic parameters for preparing the calculations above.

REFERENCES

Department of Energy, Energy Information Administration; see web site: http://www.eia.doe.gov/emeu/rtecs/contents.html, accessed January 2007.

Schrank, D. and T. Lomax (2005) "The 2005 Urban Mobility Report", Texas Transportation Institute, see http://tti.tamu.edu/documents/mobility_report_2005.pdf, (accessed January 2007).

Makris, P., A. Makri, and C. Provatidis (2005) "Energy-saving methodology for material handling applications", Journal of Applied Energy, 2005.11.005, Elsevier Press.

Anh, K. and H. Rakha (2007) "Energy And Environmental Impacts of Route Choice Decisions", in Proceedings of 2007 Transportation Research Board Annual Meeting, Washington D.C., January 2007.

Barth, M., F. An, T. Younglove, C. Levine, G. Scora, M. Ross, and T. Wenzel. (1999) "The Development of a Comprehensive Modal Emissions Model", Final report submitted to the National Cooperative Highway Research Program, November, 1999, 255 p.

Barth, M., et al., (1996) "Modal Emissions Modeling: A Physical Approach", Transportation Research Record No. 1520, pp. 81-88, Transportation Research Board, National Academy of Science.

Barth, M., T. Younglove, T. Wenzel, G. Scora, F. An, M. Ross, and J. Norbeck (1997) "Analysis of modal emissions from a diverse in-use vehicle fleet". Transportation Research Record, No. 1587, pp. 73-84, Transportation Research Board, National Academy of Science.

Barth, M. T. Younglove, and G. Scora. (2004) "The Development of a Heavy-Duty Diesel Vehicle Model", Transportation Research Record No. 1880, pp. 10-20, Journal of the Transportation Research Board, National Academy of Science.

Barth, M., C. Malcolm, T. Younglove, and N. Hill. Recent Validation Efforts for a Comprehensive Modal Emissions Model. In Transportation Research Record No. 1750, TRB, Washington, D.C., 2001, pp. 13-23.

Dowling, R., R. Ireson, A. Skarbardonis, D. Gillen, and P. Stopher. Predicting Air Quality Effects of Traffic-Flow Improvements Final Report and User's Guide. NCHRP Report 535, Transportation Research Board, Washington, D.C., 2005.

Fernandez, P. C. and Long, J. R. (1995) Grades and other loads effects on on-road emissions: an on-board analyzer study. Fifth CRC On-Road Vehicle Emission Workshop, San Diego, April 3-5.

Park, S, and Rakha, H. (2006) Energy and environmental impacts of roadway grades. Proceeding of the 85th Annual Meeting of Transportation Research Board (CD-ROM), Washington, D.C., January.

Zhu, W., and M. Barth (2006) "Vehicle Trajectory-Based Road Type and Congestion Recognition using Wavelet Analysis", Proceedings of the IEEE Intelligent Transportation Systems Conference 2006, Toronto, Canada, September 2006.

Chen, C, Jia, Z, Petty, K, Shu, J, Skabardonis, A, and Varaiya, P. "Freeway Performance Measurement System (PeMS) Shows Big Picture", feature article, California PATH Intellimotion, V 9, No. 2, 2000.

Choe, T., A. Skabardonis, P. Varaiya. (2002) "Freeway Performance Measurement System (PeMS): An Operational Analysis Tool", Proceedings of the 81st Transportation Research Board Annual Meeting, National Academies, Washington, D.C. January 2002.

Chabini, I. and S. Lan (2002) "Adaptation of A* Algorithm for the Computation of Fastest Path in Deterministic Discrete-time Dynamic Networks", IEEE Transactions on Intelligent Transportation System, vol. 3, no. 1.

Environmental Systems Research Institute, Inc., ArcGIS GIS Software Tools, see http://www.esri.com.

A number of embodiments of the invention have been described. Nevertheless, it will be understood that various modifications may be made without departing from the spirit and scope of the invention. Accordingly, other embodiments are within the scope of the following claims.

What is claimed is:

1. A system for identifying an environmentally-friendly and/or fuel saving travel route, comprising:
   an input device;
   a processor;
   wherein the input device receives at least one travel parameter and wherein the travel parameter is stored for use by the processor, the processor configured to collect (i) road condition parameters comprising traffic velocity information data and road grade, and (ii) a vehicle energy/emissions data-model;
   a computer program on a computer readable medium that cause the computer to:
     associate the road condition parameters with one or a plurality of links in a travel route, the plurality of links representing one or more possible travel routes from a start point to a destination point;
     calculate fuel consumption and/or emissions for a selected route using road condition parameters and vehicle energy/emission data-model; and
     calculate a possible travel route from the start point to the destination point, wherein the route that uses the least fuel and/or produces the least emissions is identified as a travel route from the one or more possible travel routes.

2. The system of claim 1, wherein the system is further configured to determine a fastest possible travel route.

3. The system of claim 1, wherein the road condition parameters comprise real-time road sensor information.

4. The system of claim 1, wherein the road condition parameters comprise historical road conditions.

5. The system of claim 1, wherein the vehicle energy/emission data-model further comprises driver specific driving characteristics.

6. The system of claim 1, wherein the vehicle energy/emission data-model further comprises vehicle load information.

7. The system of claim 1, wherein the links connect two or more nodes.

8. The system of claim 7, wherein the route is automatically generated from at least the start point and the destination point.

9. The system of claim 1, wherein the computer instructions further comprise instruction to determine whether the predicted route exceeds a fuel consumption or emissions value for a fastest travel route.

10. The system of claim 1, wherein the possible travel route is further associated with a calculated travel time.

11. The system of claim 1, wherein road conditions parameters comprise microscale velocity patterns of individual vehicles and macroscale traffic measurements comprising average traffic speed, density, and/or flow.

12. A method for identifying an environmentally and/or fuel saving travel route, comprising:
   collecting (i) road conditions parameters comprising traffic velocity information data and road grade, and (ii) vehicle energy/emission data-model;
   associating the road conditions parameters with one or a plurality of links in a travel route, the plurality of links representing one or more possible travel routes from a start point to a destination point;
   calculating fuel consumption and/or emissions for a selected route using road condition parameters and vehicle energy/emission data-model; and
   calculating a possible travel route from the start point to the destination point, wherein the route that uses the least fuel and/or produces the least emissions is the possible travel route from the one or more possible travel routes.

13. The method of claim 12, wherein the method further includes calculating a fastest possible travel route.

14. The method of claim 12, wherein the road condition parameters comprise real-time road sensor information.

15. The method of claim 12, wherein the road condition parameters comprise historical road conditions.

16. The method of claim 12, wherein the vehicle energy/emission data-model further comprises driver specific driving characteristics.

17. The method of claim 12, wherein the vehicle energy/emission data-model further comprises vehicle load information.

18. The method of claim 12, wherein the links connect two or more nodes.

19. The method of claim 18, wherein the route is automatically generated from at least the start point and the destination point.

20. The method of claim 12, further including determining whether the predicted route exceeds a fuel consumption or emissions value for a fastest travel route.

21. The method of claim 12, wherein the possible travel route is further associated with a calculated travel time.

22. The method of claim 12, wherein road conditions parameters comprise microscale velocity patterns of individual vehicles and macroscale traffic measurements comprising average traffic speed, density, and/or flow.

23. A navigation device that comprises a computer program for carrying out the method of claim 12.

24. The navigation device of claim 23, wherein the navigation device is an on-board navigation device.

25. The navigation device of claim 23, wherein the navigation device is a portable navigation device.

26. The navigation device of claim 23, wherein the navigation device is a portable navigation device and wherein the method is carried out by a computer at a remote location.

27. A computer-readable medium having embodied thereon instructions to cause a computer to
   collect (i) road conditions parameters comprising traffic velocity information data and road grade, and (ii) vehicle energy/emission data-model;
   associate the road conditions parameters with one or a plurality of links in a travel route, the plurality of links representing one or more possible travel routes from a start point to a destination point;
   calculate fuel consumption and/or emissions for a selected route using road condition parameters and vehicle energy/emission data-model; and
   calculate a possible travel route from the start point to the destination point, wherein the route that uses the least fuel and/or produces the least emissions is the possible travel route from the one or more possible travel routes; and
   outputting the route that uses the least fuel and/or produces the least emissions to an operator.

* * * * *